(12) United States Patent
Ho et al.

(10) Patent No.: US 7,391,579 B2
(45) Date of Patent: Jun. 24, 2008

(54) MINATURE ZOOM LENS

(75) Inventors: Wen Jen Ho, Cyonglin Township, Hsinchu County (TW); Chi Lone Chang, Jhudong Township, Hsinchu County (TW); Heng I Yu, Taichung (TW)

(73) Assignee: PowerGate Optical Inc., Hsinchu County (TW)

( * ) Notice: Subject to any disclaimer, the term of this patent is extended or adjusted under 35 U.S.C. 154(b) by 0 days.

(21) Appl. No.: 11/494,537

(22) Filed: Jul. 28, 2006

(65) Prior Publication Data
US 2007/0268595 A1 Nov. 22, 2007

(30) Foreign Application Priority Data
May 16, 2006 (TW) .............................. 95208349 U

(51) Int. Cl.
*G02B 15/14* (2006.01)
(52) U.S. Cl. ........................................ 359/696; 359/694
(58) Field of Classification Search ................ 359/694, 359/696, 703, 811, 819, 822, 823, 824
See application file for complete search history.

(56) References Cited

U.S. PATENT DOCUMENTS 5,471,100 A * 11/1995 Sakamoto et al. ............. 310/12
7,113,351 B2 * 9/2006 Hovanky ..................... 359/824
2007/0223903 A1 * 9/2007 Ho et al. ........................ 396/85
2007/0247539 A1 * 10/2007 Ho et al. ...................... 348/335

* cited by examiner

Primary Examiner—David N Spector
(74) Attorney, Agent, or Firm—Troxell Law Office, PLLC

(57) ABSTRACT

A miniature zoom lens comprises a front housing, a rear housing communicated with the front housing to form a receiving space, a connecting plate for connecting the front housing with the rear housing, a guiding module provided with at least one guiding rod, and a lens module provided with at least one lens assembly. The guiding rod passes through the lens assembly to position the lens assembly with each other in the receiving space. The lens assembly has at least one supporting base formed with at least one lens connecting portion, and at least one lens unit screw-connected to the lens connecting portion. The supporting base has an outer peripheral surface formed with a plurality of permanent magnets while the receiving space of the front and rear housings has an inner peripheral surface mounted with at least one driving coil corresponding to the permanent magnets and spaced apart from each other in a predetermined interval. The driving coil is powered to generate an electro-magnetic force interacting with the permanent magnets to actuate the lens assembly to linearly move relative to the guiding rod so that the lens assembly is used as a zoom mechanism for adjusting the focus of the lens unit.

16 Claims, 7 Drawing Sheets

MINATURE ZOOM LENS

BACKGROUND OF INVENTION

1. Field of the Invention

The present invention relates to an optical zoom lens, and more particularly to a miniature zoom lens which has at least one driving coil generating an electromagnetic force interacting with at least one permanent magnet of at least one lens assembly so as to actuate the lens assembly to linearly move relative to a guiding rod for adjusting the focus of at least one lens unit on the lens assembly.

2. Description of the Prior Art

Referring now to FIG. 1, a mechanically actuated zoom mechanism 90 used in a conventional camera device is illustrated, which is provided with a precise driving unit 91 with high manufacturing cost (for ex., stepping motor, ultrasonic motor, piezoelectric switch, and etc.), a lens unit 92, a supporting base 93 supporting the lens unit 92 and actuated by the precise driving unit 91, and other driving elements so as to complicate the entire structure of the conventional camera device and the assembling steps thereof while being disadvantageous to reduce the volume, the manufacturing cost, and the power consumption thereof.

In early stages, conventional photographic technologies were very complicated, and only provided manual functions for manually metering, zooming, and film-winding so as to create problems in imprecision. Especially, during an important occasion, if the conventional photographic technologies only take an unclear picture of an important view, the important view might passed away and not be taken another clear picture again so that the experience of a photographer is important to the quality of photograph. In the 1950's and 1960's, mechanical automation of photographic technology was developed, and more and more people believe that automation thereof is a future trend of development and research in the photographic field. The originally developed technologies of automatically metering and film-winding are evidence for automation of photographic technology, wherein a key for accelerating the velocity of a camera shutter is an "automatic zoom system" which plays a critical role in development and research of the photographic industry.

As photographic technology advanced, the conventional camera device is improved to provide a novel product with higher resolution and more compact volume for fulfilling requirements of customers in the modern information society. However, a mechanical zoom lens actuated by a stepping motor has a larger volume which can not be further reduced to become a more compact volume so as to cause a limit to improve the mechanical zoom lens. In another aspect, an electromagnetic technology is developed, and it provides an electrically feedback control system to control the offset of a voice coil motor (VCM) which is a more compact actuator used to replace the conventional stepping motor. Furthermore, various electrical mechanisms having different functions are integrated into a unit. For example, a photographic mechanism is selectively integrated into a mobile phone with a telecommunicating function, a personal digital assistant (PDA), or a notebook computer so that the mobile phone, the PDA, or the notebook computer will be able to further provide a photographic function. Thereby, when the integrated mechanisms as described above are mounted in a common device using a common power supply, it is important to develop how to reduce the entire volume, the manufacturing cost, and the power consumption thereof so as to be advantageous to increase the standby time and the communicating time of the integrated mechanisms if mounted in the same device using the same power supply of equal capacity. It is therefore tried by the inventor to develop a miniature zoom lens to solve the problems existed in the conventional mechanically optical zoom lens.

SUMMARY OF INVENTION

A primary object of the present invention is to provide a miniature zoom lens, which is provided with a more compact volume, a simpler structure, and lower power consumption.

A secondary object of the present invention is to provide a miniature zoom lens, which is provided with a front housing and a rear housing to commonly form a receiving space with an inner peripheral surface to mount at least one driving coil while a guiding module is provided with at least one guiding rod to position at least one lens assembly and a connecting plate in the front and rear housings, in operation, the driving coil being powered to generate an electromagnetic force interacting with a plurality of permanent magnets formed on at least one supporting base of the lens assembly to actuate the lens assembly to linearly move relative to the guiding rod which guides the lens assembly so that the miniature zoom lens of the present invention can be constructed without any conventional stepping motor to decrease the component amount and the entire volume thereof, and to simplify the structure thereof.

A third object of the present invention is to provide a miniature zoom lens, which generates an attractive force between the permanent magnets assembled on the supporting base and at least one positioning member assembled on the front housing, the rear housing, and the connecting plate when the driving coil is not powered so that the lens assembly is stably positioned in a predetermined position for the purpose of reducing the power consumption thereof.

A fourth object of the present invention is to provide a miniature zoom lens, which one of the lens assemblies is selected from an automatic focus mechanism to considerably shift and zoom between the lens assemblies while the automatic focus mechanism thereof is used to precisely adjust the focus thereof for the purpose of increasing the image resolution of the miniature zoom lens.

To achieve the above and other objects, the miniature zoom lens according to a preferred embodiment of the present invention comprises a front housing, a rear housing communicated with the front housing to form a receiving space, a connecting plate for connecting the front housing with the rear housing, a guiding module provided with a plurality of positioning members, at least one driving coil, and at least one guiding rod, and a lens module provided with at least one lens assembly. The guiding rod passes through the lens assembly to position the lens assembly with each other in the receiving space. The lens assembly has at least one supporting base formed with at least one lens connecting portion, and at least one lens unit screw-connected to the lens connecting portion. The supporting base has an outer peripheral surface formed with a plurality of permanent magnets while the receiving space of the front and rear housings has an inner peripheral surface mounted with a first coil and a second coil of the driving coil corresponding to the permanent magnets. The first and second coils of the driving coil are spaced apart from the permanent magnets of the supporting base in a predetermined interval. The driving coil is powered to generate an electromagnetic force interacting with the permanent magnets to actuate the lens assembly to linearly move to a predetermined position of the position members along the guiding rod. The position members are selected from yoke iron for magnetically attracting the permanent magnets when the driving coil is not powered so that the lens assembly is stably positioned in the predetermined position of the position members for the purpose of adjusting the relative positions and reducing the power consumption of the miniature zoom lens.

In another preferred embodiment of the present invention, one of the lens assemblies is selected from an automatic focus mechanism having a driving coil to actuate a lens connecting portion connecting with a lens unit to precisely adjust the focus of the lens unit for the purpose of increasing the image resolution of the miniature zoom lens.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION

A miniature zoom lens according to a preferred embodiment of the present invention is operated by an electromagnetic force which is provided with an electromagnetic attractive force or an electromagnetic repulsive force interacting between at least one driving coil and at least one permanent magnet for shifting the permanent magnet. When the driving coil is powered by an electric current, the driving coil is excited to generate the electromagnetic attractive force attractive to a magnetic force of the permanent magnet so that the permanent magnet shifts along a guiding rod toward a predetermined direction. Contrarily, when the driving coil is powered by an electric current with a reverse direction, the driving coil is excited to generate the electromagnetic repulsive force repulsive to the magnetic force of the permanent magnet so that the permanent magnet shifts along the guiding rod toward a reverse direction. According to the electromagnetic principle as described above, the driving coil is mounted on an inner peripheral surface of a front housing and a rear housing, and the permanent magnet is mounted on an outer peripheral surface of at least one supporting base actuated by the electromagnetic force of the driving coil so as to shift at least one lens unit mounted on the supporting base. The front and rear housings are mounted with a plurality of positioning members in a plurality of suitable positions to magnetically attract to the permanent magnet for stably positioning the lens unit when the lens unit reached a predetermined zoom position during which the driving coil is not powered by the electric current for the purpose of reducing the power consumption. Furthermore, the supporting base is selectively connected with an automatic focus mechanism for the purpose of considerably and precisely adjusting the focus of the lens unit.

Figure 1:
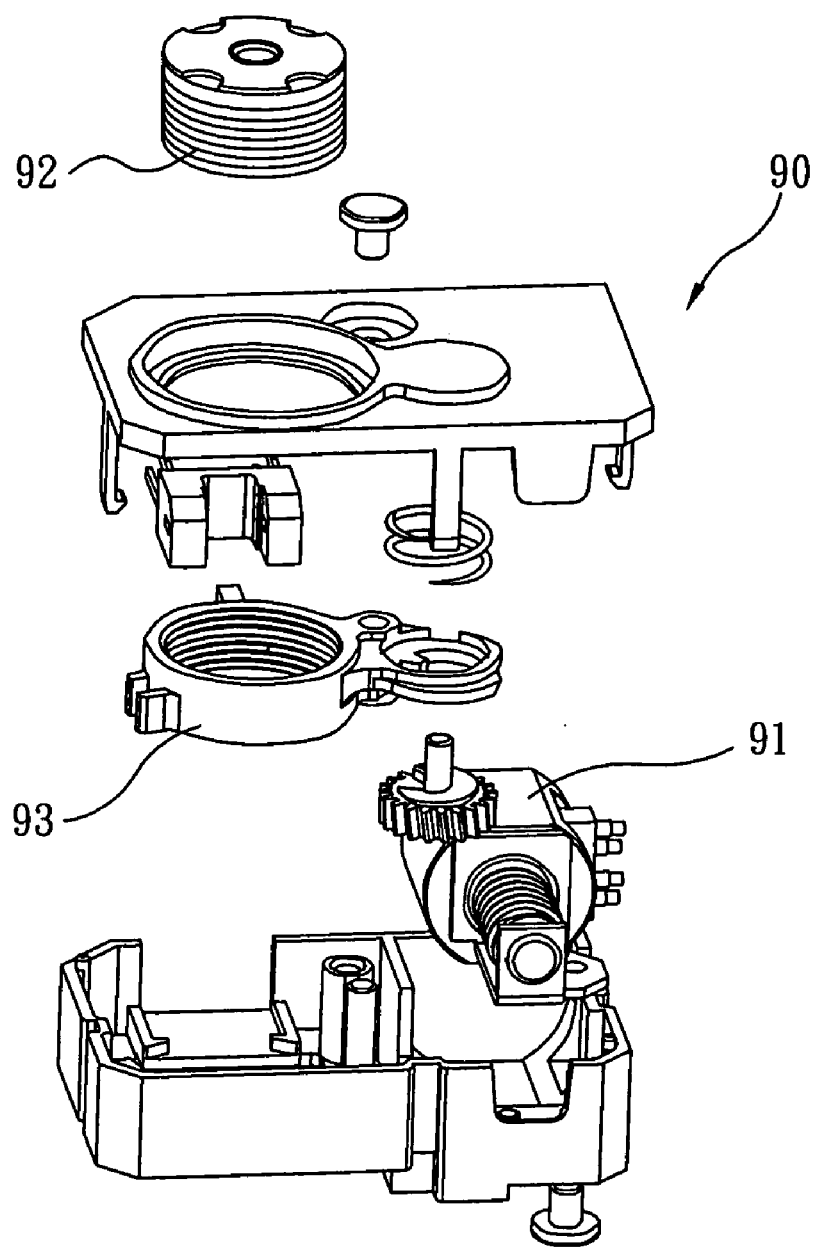
FIG. 1 is an exploded perspective view of a mechanically actuated zoom mechanism used in a conventional camera device.
Figure 2:
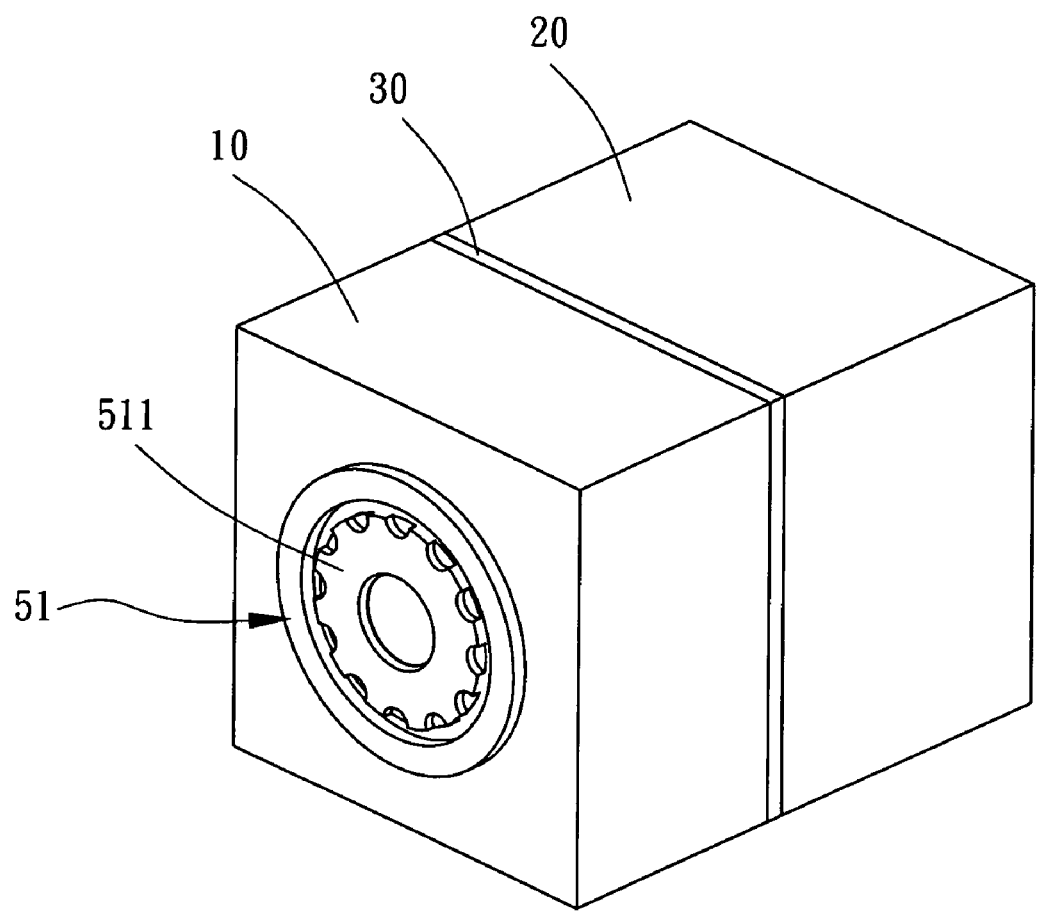
FIG. 2 is an assembled perspective view of a miniature zoom lens according to a first preferred embodiment of the present invention.
Figure 3:
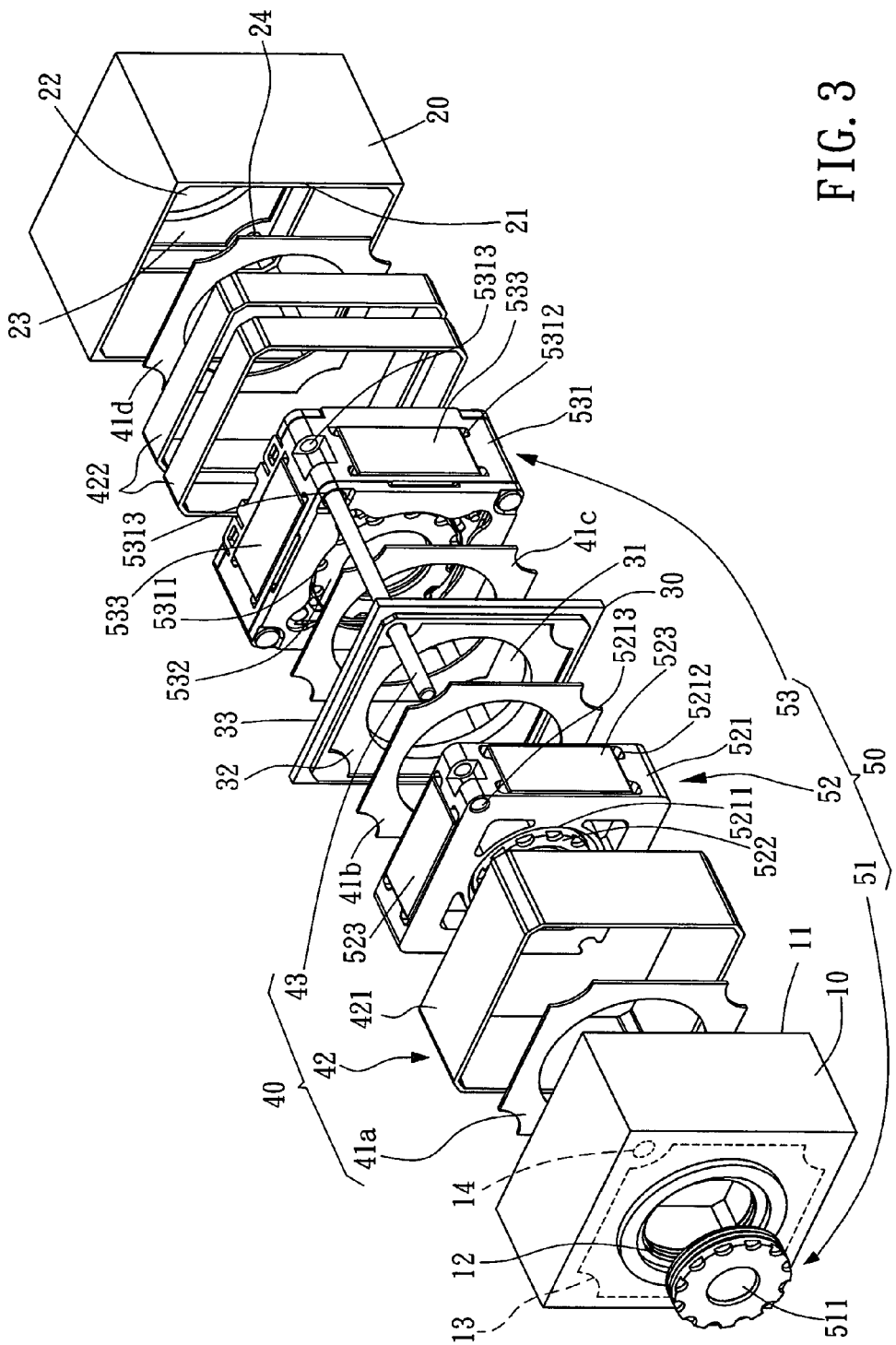
FIG. 3 is an exploded perspective view of the miniature zoom lens according to the first preferred embodiment of the present invention, similar to FIG. 2.
Figure 4:
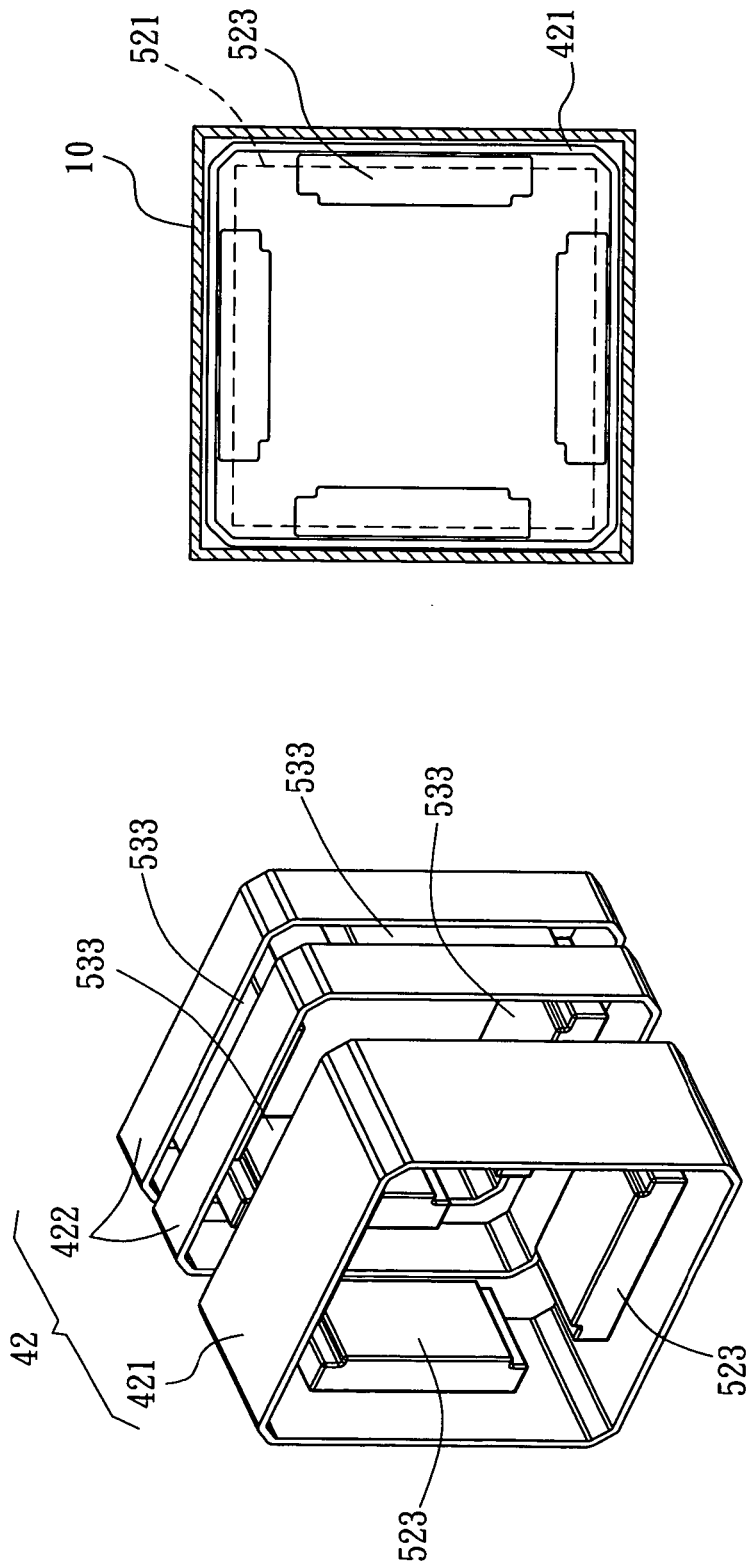
FIG. 4 is an assembled perspective view and a front view of at least one driving coil relative to at least one permanent magnet in the miniature zoom lens according to the first preferred embodiment of the present invention.
Figure 5:
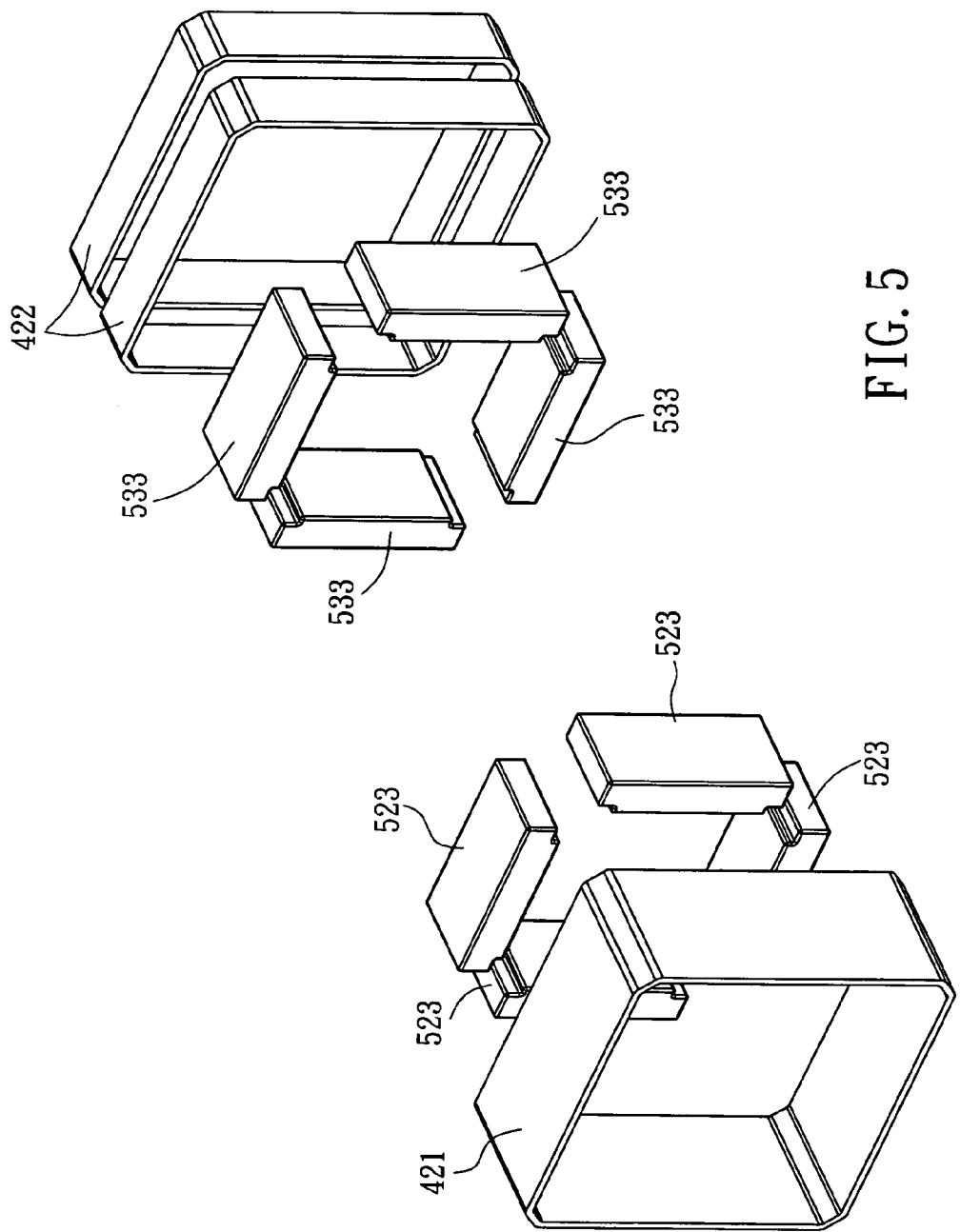
FIG. 5 is an exploded perspective view of the driving coil relative to the permanent magnet in the miniature zoom lens according to the first preferred embodiment of the present invention, similar to FIG. 4.
Figure 6:
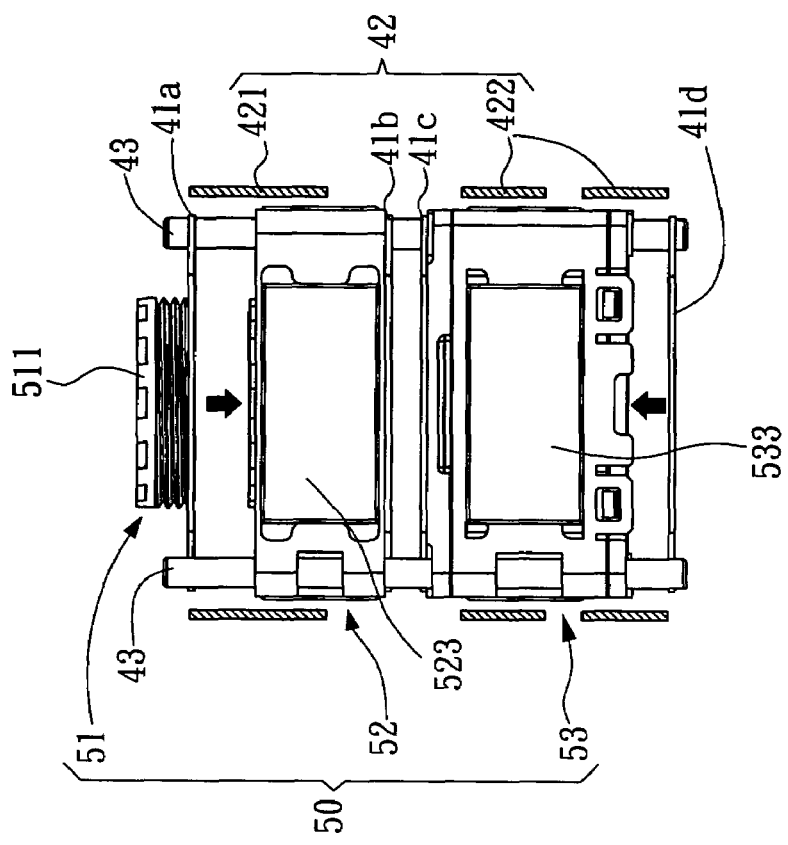
FIG. 6 and 7 shows the miniature zoom lens according to the first preferred embodiment of the present invention in use.
Figure 7:
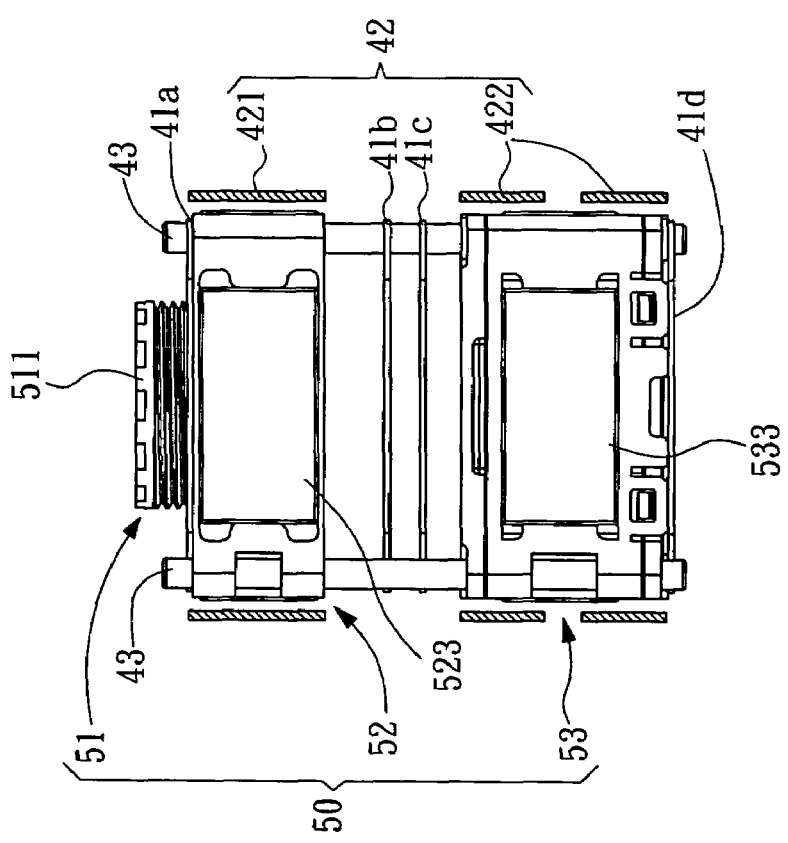
Figure 8:
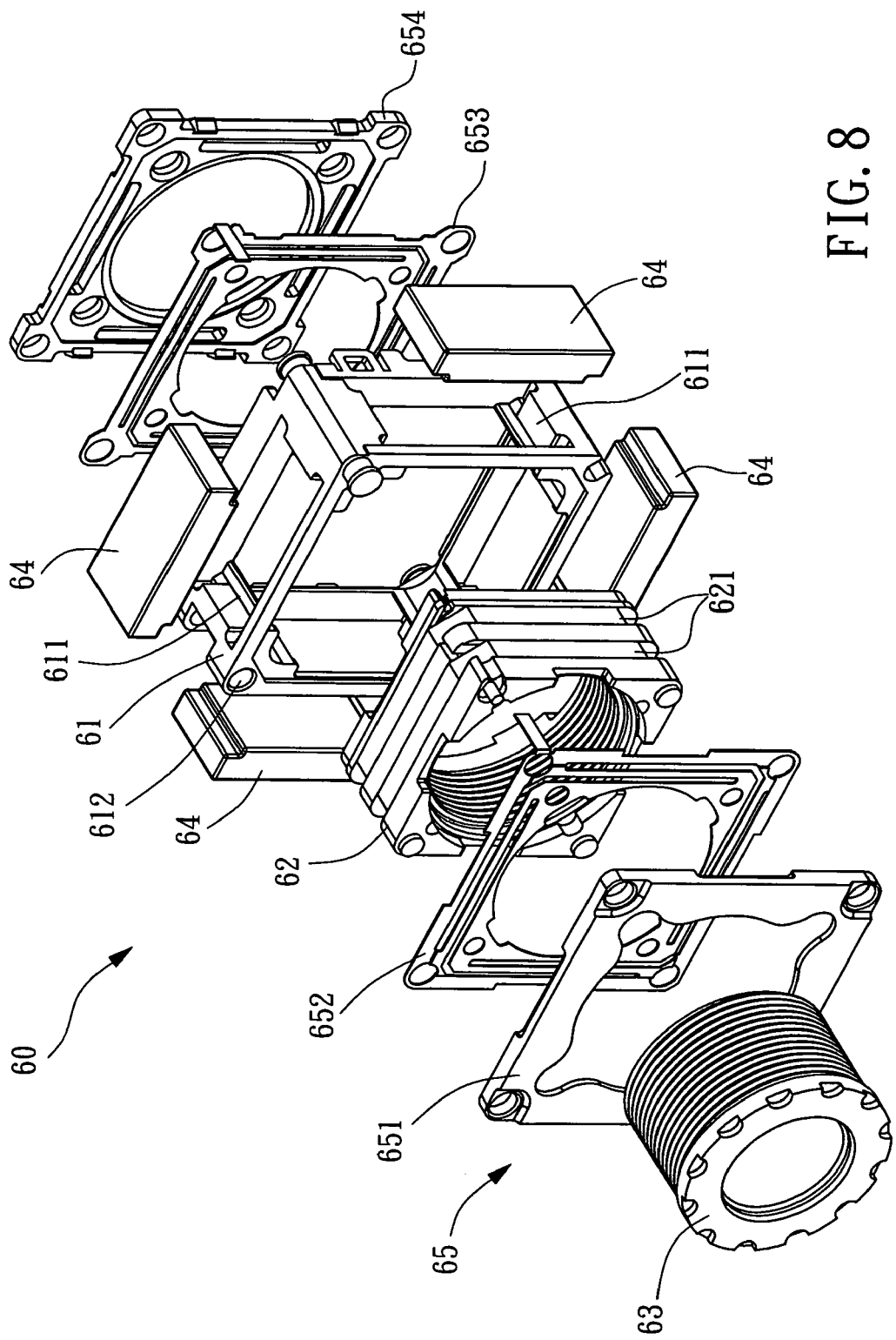
FIG. 8 is an exploded perspective view of an automatic focus mechanism of a miniature zoom lens according to a second preferred embodiment of the present invention.

Referring now to FIGS. 2 to 8, FIG. 2 is an assembled perspective view of a miniature zoom lens according to a first preferred embodiment of the present invention; FIG. 3 is an exploded perspective view of the miniature zoom lens according to the first preferred embodiment of the present invention, similar to FIG. 2; FIG. 4 is an assembled perspective view and a front view of at least one driving coil relative to at least one permanent magnet in the miniature zoom lens according to the first preferred embodiment of the present invention; FIG. 5 is an exploded perspective view of the driving coil relative to the permanent magnet in the miniature zoom lens according to the first preferred embodiment of the present invention, similar to FIG. 4; FIG. 6 and 7 shows the miniature zoom lens according to the first preferred embodiment of the present invention in use; and FIG. 8 is an exploded perspective view of an automatic focus mechanism of a miniature zoom lens according to a second preferred embodiment of the present invention.

Referring now to FIGS. 2 and 3, the miniature zoom lens according to the first preferred embodiment of the present invention comprises a hollow front housing 10, a hollow rear housing 20, a connecting plate 30, a guiding module 40, and a lens module 50. The guiding module 40 is provided with a plurality of positioning members 41a, 41b, 41c, and 41d each of which is made of magnetically conductive material such as yoke iron and has a through hole formed at the center thereof, at least one driving coil 42, and at least one guiding rod 43. The number of the at least one guiding rod 43 is preferably two. The lens module 50 is provided with a first lens assembly 51, a second lens assembly 52, and a third lens assembly 53.

Referring now to FIG. 3, the front housing 10 is a hollow half body having an opening 11 on a rear side thereof, a threaded hole 12 on a front side opposite to the rear side, a positioning basin 13 formed therein, and at least one positioning recess 14 formed therein too. The opening 11 of the front housing 10 is used to connect to the connecting plate 30, and the threaded hole 12 of the front housing 10 is used to connect with a first lens unit 511 of the first lens assembly 51 while the positioning basin 13 of the front housing 10 is used to receive the positioning member 41a of the guiding module 40.

Referring now to FIG. 3, the rear housing 20 is also a hollow half body having an opening 21 on a front side thereof, a hole 22 on a rear side opposite to the front side, a positioning basin 23 formed therein, and at least one positioning recess 24 formed therein too. The opening 21 of the rear housing 20 is used to connect to the connecting plate 30, and the hole 22 of the rear housing 20 is used to guide light into the rear housing 20 while the positioning basin 23 of the rear housing 20 is used to receive the positioning member 41d of the guiding module 40. The front housing 10 is communicated with the rear housing 20 to commonly form a receiving space (unlabeled).

Referring now to FIG. 3, the connecting plate 30 is provided with a through hole 31 on a center portion thereof, a positioning basin 32 formed on a front side thereof, a positioning basin 33 formed on a rear side thereof opposite to the front side, and at least one guiding hole 34 formed on at least one corner portion thereof. The through hole 31 is used to communicate the receiving space of the front housing 10 with that of the rear housing 20. The positioning basin 32 of the connecting plate 30 is used to receive the positioning member 41b of the guiding module 40 while the positioning basin 33 thereof is used to receive the positioning member 41c of the guiding module 40. The number of the at least one guiding hole 34 is preferably two. In assembling, the guiding rod 43 can pass through the guiding hole 34 to couple the second lens assembly 52 with the third lens assembly 53 while two ends of the guiding rod 43 are positioned in the positioning recess 14, 24 of the front housing 10 and rear housing 20 respectively so that the second lens assembly 52 and the third lens assembly 53 are positioned in the receiving space of the front housing 10 and rear housing 20 and separated from each other by the connecting plate 30. Meanwhile, the axes of the first lens assembly 51, the second lens assembly 52 and the third lens assembly 53 will be longitudinally aligned with each other by the guiding rod 43.

Referring now to FIG. 3, the second lens assembly 52 of the lens module 50 is provided with a first supporting base 521, a second lens unit 522, and at least one first permanent magnet 523. The first supporting base 521 is formed with a lens connecting portion 5211 to connect with the second lens unit 522, at least one magnet recess 5212 on an outer peripheral surface thereof for receiving the first permanent magnet 523, and at least one guiding hole 5213 on at least one corner portion thereof. The number of the at least one guiding hole 5213 is preferably two. In assembling, the guiding rod 43 can pass through the guiding hole 5213 to guide the first supporting base 521 and the second lens unit 522 of the second lens assembly 52 to linearly move relative to the guiding rod 43.

Referring now to FIG. 3, the third lens assembly 53 of the lens module 50 is provided with a second supporting base 531, a third lens unit 532, and at least one second permanent magnet 533. The second supporting base 531 is formed with a lens connecting portion 5311 to connect with the third lens unit 532, at least one magnet recess 5312 on an outer peripheral surface thereof for receiving the second permanent magnet 533, and at least one guiding hole 5313 on at least one corner portion thereof. The number of the at least one guiding hole 5313 is preferably two. In assembling, the guiding rod 43 can pass through the guiding hole 5313 to guide the second supporting base 531 and the third lens unit 532 of the third lens assembly 53 to linearly move relative to the guiding rod 43.

Referring now to FIGS. 3, 4, and 5, the at least one driving coil 42 of the guiding module 40 is provided with a first coil 421 mounted on the inner peripheral surface of the front housing 10, and a second coil 422 mounted on the inner peripheral surface of the rear housing 20. The first coil 421 is corresponding to the at least one first permanent magnet 523 on the first supporting base 521 of the second lens assembly 52, and spaced apart from each other in a predetermined interval. Meanwhile, the second coil 422 is corresponding to the at least one second permanent magnet 533 on the second supporting base 531 of the third lens assembly 53, and spaced apart from each other in a predetermined interval. The first and second coils 421, 422 are powered by an electric current, the first and second coils 421, 422 will generate an electromagnetic force interacting with the first and second permanent magnets 523, 533 on the first and second supporting base 521, 531, respectively. It results in that the first permanent magnets 523 and the first supporting base 521 can move relative to the first coil 421 and be substantially retained by the extending direction of the guiding rod 43 and the positioning members 41a, and 41b. Meanwhile, the second permanent magnets 533 and the second supporting base 531 can move relative to the second coil 422 and be substantially retained by the extending direction of the guiding rod 43 and the positioning members 41c, and 41d. In the first preferred embodiment of the present invention, the positioning members 41a, 41b, 41c, and 41d are preferably selected from yoke iron able to attract with the first and second permanent magnet 523, 533. Furthermore, the first and second coils 421, 422 are selectively powered by various actuating methods. For example, if the first permanent magnet 523 on the first supporting base 521 is magnetized to form a single pole (i.e. N or S pole) on a surface facing the first coil 421, the first coil 421 corresponding to the first permanent magnet 523 is preferably selected from a coil powered by a current with a constant flow direction. In another aspect, if the second permanent magnet 533 on the second supporting base 531 is magnetized to form a pair of poles (i.e. N and S poles) on a surface facing the second coil 422, the second coil 422 corresponding to the second permanent magnet 533 is preferably selected from a pair of coils with different winding directions or powered by two currents with different flow directions.

Referring now to FIGS. 6 and 7, when the first coil 421 of the driving coil 42 is powered by an electric current, the first coil 421 generates an electromagnetic force interacting with the first permanent magnet 523 so as to actuate the second lens assembly 52 to move apart from the positioning member 41a in the front housing 10 which is a 1-fold (1×) focus position, as the initial position shown in FIG. 6, and then shift toward the rear housing 20 until attaching to the positioning member 41b on the front side of the connecting plate 30, i.e. a 2-fold or more (2× or more) focus position, as in the position shown in FIG. 7. When the second coil 422 of the driving coil 42 is powered by an electric current, the second coil 422 generates an electromagnetic force interacting with the second permanent magnet 533 so as to actuate the third lens assembly 53 to move apart from the positioning member 41d in the rear housing 20 which is a 1-fold (1×) focus position, as in the initial position shown in FIG. 6, and then shift toward the front housing 10 until attaching to the positioning member 41c on the rear side of the connecting plate 30, i.e. a 2-fold or more (2× or more) focus position, as in the position shown in FIG. 7. Preferably, the second assembly 52 moves to the position of the positioning member 41b while the third lens assembly 53 synchronously moves to the position of the positioning member 41c.

Referring now to FIG. 6, when the first coil 421 and the second coil 422 are powered by two electric currents having different flow directions, the second lens assembly 52 is actuated by the electromagnetic force of the first coil 421 to return back to the 1-fold (1×) position and attach to the positioning member 41a mounted in the front housing 10 while the third lens assembly 53 is actuated by the electromagnetic force of the second coil 422 to return back to the 1-fold (1×) position and attach to the positioning member 41d mounted in the rear housing 20.

Referring now to FIG. 6, when the first coil 421 and the second coil 422 are not powered by any electric current, the second lens assembly 52 attaches to the positioning member 41b on the front side of the connecting plate 30 by the first permanent magnet 523 while the third lens assembly 53 attaches to the positioning member 41c on the rear side of the connecting plate 30 by the second permanent magnet 533. Hence, even though the first coil 421 and the second coil 422 are not powered by any electric current, the second lens assembly 52 and the third lens assembly 53 can be stably positioned adjacent to the positioning members 41b, 41c for the purpose of reducing the power consumption of the miniature zoom lens of the present invention.

Referring now to FIG. 8, a miniature zoom lens according to a second preferred embodiment of the present invention is illustrated, wherein the third lens assembly 53 of the first preferred embodiment is further selected from an automatic focus mechanism 60 which is provided with a supporting base 61, a lens connecting portion 62, a focus lens unit 63, a plurality of permanent magnets 64, and a vibration damper 65.

Referring now to FIG. 8, the supporting base 61 is formed with a receiving space (unlabeled) for receiving the lens connecting portion 62, a plurality of magnet recesses 611 on an outer peripheral surface thereof for positioning the permanent magnets 64, at least one guiding hole 612 on at least one corner portion thereof for being inserted by the guiding rod 43. The number of the at least one guiding hole 612 is preferably two. Moreover, the focus lens unit 63 is received in the lens connecting portion 62 which has an outer peripheral surface mounted with a pair of third coils 621 with different actuating methods. When the third coils 621 are powered by two currents with different flow directions, the third coils 621 generate an electromagnetic force interacting with the permanent magnets 64 on the supporting base 61 to actuate the lens connecting portion 62 to slightly shift in the receiving space of the supporting base 61 so that the focus lens unit 63 is precisely actuated to adjust the focus thereof.

Referring now to FIG. 8, the vibration damper 65 has a cover 651, a first spring 652, a second spring 653, and a base 654. The cover 651 and the base 654 are respectively connected to a front side and a rear side of the supporting base 61 for positioning the lens connecting portion 62 therebetween. The first spring 652 is sandwiched between the cover 651 and the lens connecting portion 62 while the second spring 653 is sandwiched between the base 654 and the lens connecting portion 62. In the vibration damper 65, the first spring 652 and the second spring 653 at two sides of the lens connecting portion 62 commonly provide a sufficient force to stably suspend and support the lens connecting portion 62. Thus, while the lens connecting portion 62 moves forward (or backward), or when the lens connecting portion 62 retains but is affected by an external force, the first spring 652 and the second spring 653 of the vibration damper 65 can suitably provide a damping effect to reduce vibration of the lens connecting portion 62 and position the lens connecting portion 62. Preferably, the first spring 652 and the second spring 653 of the present invention are selected from a pair of planar leaf springs to increase the precision of focus function of the automatic focus mechanism 60.

Referring now to FIG. 8, the permanent magnets 64 for slightly shifting the focus lens unit 63 in the automatic focus mechanism 60 (i.e. the third lens assembly 53 of the first embodiment) and adjusting the focus of the focus lens unit 63 is equivalent to the second permanent magnets 533 of the third lens assembly 53 of the first embodiment used for considerably shifting the third lens assembly 53 and adjusting the focus thereof. In other words, in the second preferred embodiment of the present invention, the permanent magnets 64(533) are used to interact with the second coil 422 for considerably shifting the third lens assembly 53 and adjusting the focus thereof while the permanent magnets 64(533) are used to interact with the third coils 621 in the automatic focus mechanism 60 (i.e. the third lens assembly 53) for slightly shifting the focus lens unit 63 and adjusting the focus thereof. Thereby, the permanent magnets 64(533) have a dual function to decrease the amount of total permanent magnets and reduce the manufacturing cost thereof.

The present invention has been described with a preferred embodiment thereof and it is understood that various changes and modifications in the described embodiment can be carried out without departing from the scope and the spirit of the invention that is intended to be limited only by the appended claims.

What is claimed is:

1. A miniature zoom lens, comprising:
    a hollow front housing;
    a hollow rear housing connected to the front housing to form a receiving space between the front housing and the rear housing;
    a first lens assembly having a first lens unit mounted on the front housing;
    a second lens assembly having a first supporting base, a second lens unit, and at least one first permanent magnet;
    a third lens assembly having a second supporting base, a third lens unit, and at least one second permanent magnet, wherein at least one of the second lens assembly and the third lens assembly is received in the receiving space;
    a guiding module having a plurality of positioning members made of magnetically conductive material positioned on a plurality of predetermined positions in the front housing and the rear housing; and
    at least one driving coil having a first coil mounted on an inner peripheral surface of the front housing and corresponding to the first permanent magnet, and a second coil mounted on an inner peripheral surface of the rear housing and corresponding to the second permanent magnet;
    wherein when the first coil and the second coil are powered by a predetermined current, the first coil and the second coil generate an electromagnetic force interacting with the first permanent magnet and the second permanent magnet to move the second lens assembly and the third lens assembly; and
    when the first coil and the second coil are not powered, the positioning members attract with the first permanent magnet and the second permanent magnet to position the second lens assembly and the third lens assembly on the predetermined positions in the front housing and the rear housing.

2. The miniature zoom lens as claimed in claim 1, further comprising a connecting plate provided with a through hole on a center portion thereof, a pair of positioning basins formed on a front side and a rear side thereof, and at least one guiding hole formed on at least one corner portion thereof, wherein the receiving space of the front housing is communicated with that of the rear housing by the through hole, while the positioning basins receiving the positioning members of the guiding module, the front side of the connecting plate connecting to an opening of the front housing, the rear side of the connecting plate connecting to an opening of the rear housing, the guiding hole being passed through by a guiding rod of the guiding module so that the front housing, the second lens assembly, the connecting plate, the third lens assembly, and the rear housing are longitudinally aligned with each other, and wherein the positioning members are made of yoke iron.

3. The miniature zoom lens as claimed in claim 1, wherein said first supporting base is formed with a lens connecting portion to connect with the second lens unit, and at least one magnet recess on an outer peripheral surface thereof for receiving the first permanent magnet which is magnetized to form a single pole.

4. The miniature zoom lens as claimed in claim 1, wherein said second supporting base is formed with a lens connecting portion to connect with the third lens unit, and at least one magnet recess on an outer peripheral surface thereof for receiving the second permanent magnet which is magnetized to form a pair of poles while the second coil corresponding to the second permanent magnet is selected from a pair of coils having different current flow directions.

5. The miniature zoom lens as claimed in claim 1, wherein said third lens assembly is selected from an automatic focus mechanism which is provided with a lens connecting portion for receiving the third lens unit while the lens connecting portion has an outer peripheral surface mounted with at least one third coil, wherein the second supporting base of the third lens assembly is further formed with a receiving space for receiving the lens connecting portion to actuate the lens connecting portion to slightly shift in the receiving space so that the third lens unit is precisely actuated to adjust the focus thereof, wherein an outer peripheral surface of the second supporting base is formed with at least one magnet recess for receiving the at least one second permanent magnet corresponding to the third coil; and wherein the third lens assembly is further provided with a vibration damper having a cover, a first spring, a second spring, and a base, the cover and the base are respectively connected to a front side and a rear side of the second supporting base for positioning the lens connecting portion therebetween, and the first spring is sandwiched between the cover and the lens connecting portion while the second spring is sandwiched between the base and the lens connecting portion.

6. The miniature zoom lens as claimed in claim 5, wherein said at least one third coil mounted on the outer peripheral surface of the lens connecting portion is selected from a pair of coils having different current flow directions while the second permanent magnet is magnetized to form a pair of poles, and wherein the first spring and the second spring are selected from a pair of planar leaf springs.

7. A miniature zoom lens, comprising:
   a hollow front housing;
   a hollow rear housing connected to the front housing to form a receiving space between the front housing and the rear housing;
   at least two driving coils mounted on an inner peripheral surface of the front housing and an inner peripheral surface of the rear housing, respectively;
   at least two lens assemblies movably received in the receiving space of the front housing and the rear housing; and
   at least two permanent magnets mounted on the at least two lens assemblies and corresponding to the at least two driving coils;
   wherein the at least two driving coils are powered by a predetermined current to generate an electromagnetic force interacting with the at least two permanent magnets to move the at least two lens assembly,
   wherein said at least two driving coils are a first coil mounted on the inner peripheral surface of the front housing, and a second coil mounted on the inner peripheral surface of the rear housing while the second coil is selected from a pair of coils having different current flow directions.

8. The miniature zoom lens as claimed in claim 7, wherein said at least two lens assemblies comprises a first lens assembly having a first lens unit mounted on the front housing; a second lens assembly having a first supporting base and a second lens unit; and a third lens assembly having a second supporting base and a third lens unit, wherein the at least two permanent magnets are received in at least one magnet recess of the first supporting base and at least one magnet recess of the second supporting base while corresponding to the at least two driving coils, and wherein each of the at least two permanent magnets is selectively magnetized to form a single pole or a pair of poles.

9. The miniature zoom lens as claimed in claim 8, further comprising a plurality of positioning members, each of which is made of yoke iron and has a through hole formed at the center thereof, the positioning members are mounted on at least one positioning basin formed in the first housing and at least one positioning basin formed in the second housing, and wherein the positioning members are attached to at least one of the at least two permanent magnets on the at least two lens assemblies for positioning at least one of the at least two permanent magnets on at least one position of the positioning members.

10. The miniature zoom lens as claimed in claim 8, wherein said third lens assembly is selected from an automatic focus mechanism which is provided with a lens connecting portion for receiving the third lens unit while the lens connecting portion has an outer peripheral surface mounted with at least one third coil, wherein the second supporting base of the third lens assembly is formed with a receiving space for receiving the lens connecting portion to actuate the lens connecting portion to slightly shift in the receiving space so that the third lens unit is precisely actuated to adjust the focus thereof, wherein an outer peripheral surface of the second supporting base is formed with at least one magnet recess for receiving at least one of the at least two permanent magnets corresponding to the third coil; and wherein the third lens assembly is further provided with a vibration damper having a cover, a first spring, a second spring, and a base, the cover and the base are respectively connected to a front side and a rear side of the second supporting base for positioning the lens connecting portion therebetween, and the first spring is sandwiched between the cover and the lens connecting portion while the second spring is sandwiched between the base and the lens connecting portion.

11. The miniature zoom lens as claimed in claim 10, wherein said third coil mounted on the outer peripheral surface of the lens connecting portion is selected from a pair of coils having different current flow directions while the permanent magnet received in the magnet recess of the second supporting base is magnetized to form a pair of poles.

12. A miniature zoom lens, comprising:
   at least two lens assemblies movably aligned with each other;
   at least two permanent magnets comprising at least one first permanent magnet and at least one second permanent magnet mounted on the at least two lens assemblies, respectively;
   at least two driving coils comprising a first coil corresponding to the first permanent magnet, and a second coil corresponding to the second permanent magnet, the at least two driving coils being powered by a predetermined current to generate an elector-magnetic force interacting with the at least two permanent magnets to actuate the at least two lens assemblies to shift relative to each other for adjusting the focus thereof; and
   an automatic focus mechanism mounted on one of the at least two lens assemblies and provided with a supporting base, a lens connecting portion movably received in the supporting base, and at least one third coil mounted on an outer peripheral surface of the supporting base;
   wherein the third coil is aligned with the at least one second permanent magnet, the third coil is powered by a predetermined current to generate an electromagnetic force interacting with the at least one second permanent magnet to slightly move the lens connecting portion relative to the supporting base of the automatic focus mechanism for adjusting the focus thereof.

13. The miniature zoom lens as claimed in claim 12, wherein said at least two lens assemblies comprise a first lens assembly having a first lens unit; a second lens assembly having a first supporting base and a second lens unit; and a third lens assembly having the automatic focus mechanism.

14. The miniature zoom lens as claimed in claim 13, further comprising:
   a hollow front housing for mounting the first lens unit;
   a hollow rear housing connected to the front housing to form a receiving space between the front housing and the rear housing for receiving the second lens assembly and the third lens assembly; and
   a plurality of positioning members respectively having a through hole formed at the center thereof, the positioning members attached to at least one of the at least two permanent magnets on the at least two lens assemblies for positioning at least one of the at least two permanent magnets on at least one position of the positioning members in the receiving space of the front housing and the rear housing, and wherein the positioning members are made of yoke iron.

15. The miniature zoom lens as claimed in claim 14, wherein said first permanent magnet is received in at least one magnet recess formed on the first supporting base of the second lens assembly and corresponding to the first coil, wherein said second permanent magnet is received in at least one magnet recess formed on the supporting base of the automatic focus mechanism and corresponding to the second coil, and wherein the first and second permanent magnets are selectively magnetized to form a single pole or a pair of poles.

16. The miniature zoom lens as claimed in claim 15, wherein said third coil mounted on the outer peripheral surface of the lens connecting portion of the automatic focus mechanism is selected from a pair of coils having different current flow directions while the second permanent magnet is magnetized to form a pair of poles.

* * * * *